Nov. 16, 1948.  R. H. RUNK ET AL  2,454,210
SYNTHETIC RESIN AND MEMBERS PRODUCED THEREFROM
Filed April 17, 1943
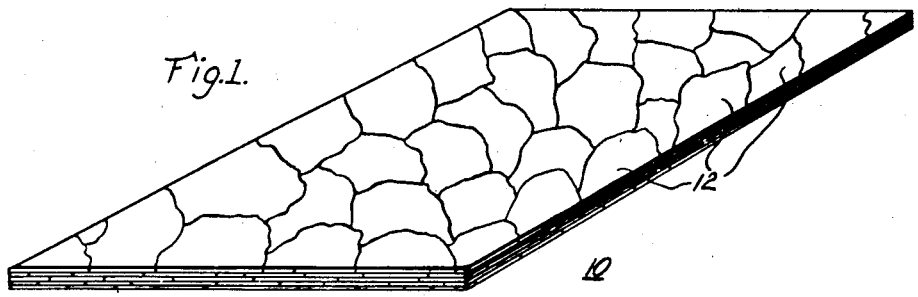
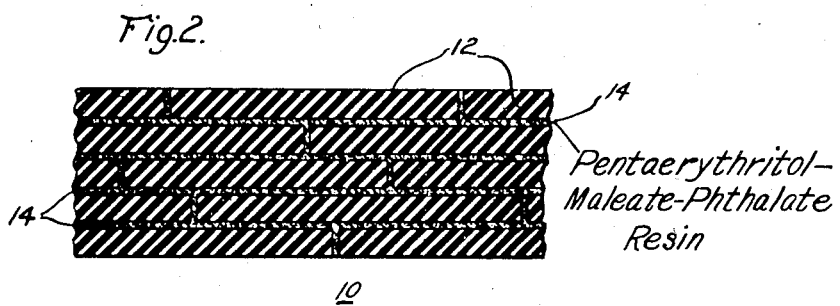
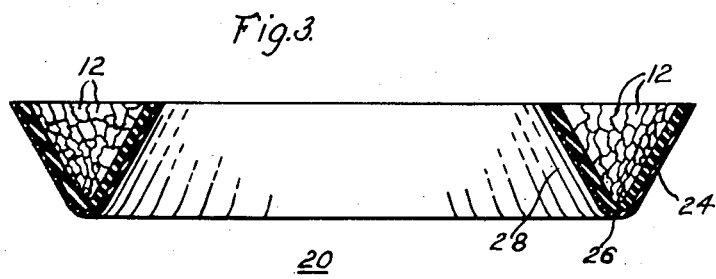
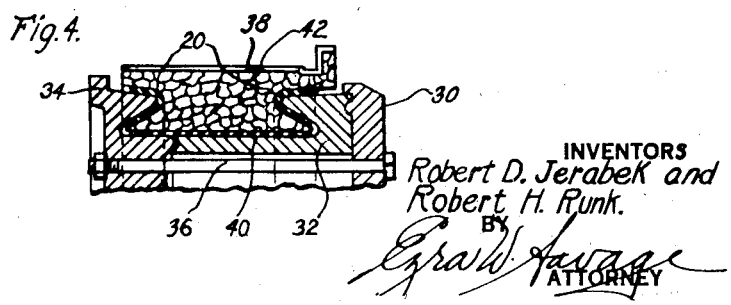
WITNESSES:
INVENTORS
Robert D. Jerabek and
Robert H. Runk.
BY
ATTORNEY Patented Nov. 16, 1948

2,454,210

UNITED STATES PATENT OFFICE 2,454,210

SYNTHETIC RESIN AND MEMBERS PRODUCED THEREFROM

Robert H. Runk, Pittsburgh 21, and Robert D. Jerabek, Wilkinsburg, Pa., assignors to Westinghouse Electric Corporation, East Pittsburgh, Pa., a corporation of Pennsylvania Application April 17, 1943, Serial No. 483,490

10 Claims. (Cl. 154—2.6)

This invention relates to synthetic resins and, in particular, to thermosetting resins for use in producing electrical insulation.

Insulation for dynamoelectric machines requires not only predetermined electrical insulating characteristics, but also certain predetermined physical properties. Heretofore insulation produced by the application of shellac in combination with mica flakes has been employed for the most severe insulating applications involving high physical stresses. In some respects, however, shellac has not been entirely satisfactory. When subjected to temperatures above 85° C., shellac softens and its electric properties begin to deteriorate. A further source of failure in heavy duty service has been the lack of complete thermal setting in the shellac. Squeeze-out and occasional slip failures have been traced to the failure of shellac to thermoset under normal processing conditions.

The requirements for a resin binder for use with mica flakes, in particular to produce insulation as good as that produced with shellac, or better, includes the following factors:

TABLE I

ASTM short time dielectric strength—625 volts per mil
Power factor, 50 volts per mil, 60 cycles, 25° C.— less than 10%
Surface resistivity—10 megohms
Tracking—none
ARC resistance—more than 150 seconds
Water absorption, 24 hours at 25 pounds per square inch—less than 5%
Oil absorption—less than 5%
Seasoning set at 150° C., three hours at 1000 pounds per square inch—1% to 2¼%
Tensile strength—15,000 pounds per square inch
Impact (Charpy) in. lbs. on 1" x 6" x .032"— 1.4 pounds In addition, the resin should bond to mica. The bond should be sufficiently strong to resist slippage at pressures of 15,000 pounds per square inch at 175° C. on samples pressed between steel blocks cut at an angle of 6° with the horizontal.

In producing mica insulation certain manufacturing requirements must be met for the most satisfactory results. In producing insulation of predetermined thickness, it is frequency necessary to mold the sheets of mica flakes and applied resinous binder to a partially hardened state and sand such sheets to remove high spots. If the resinous binder is insufficiently hardened, it will gum up the sanding rolls or other abrasive device and thereby the operation will not be satisfactory. However, the resinous binder should not be set so hard as to prevent a remolding to a predetermined shape such as a V-ring or the like.

The object of this invention is to provide a thermosetting resin by combining pentaerythritol, maleic acid and phthalic acid, or their respective anhydrides, in predetermined proportions.

A further object of this invention is to provide electrical insulation composed of mica flakes and a thermosetting synthetic resinous binder.

A still further object of this invention is to provide a resinous binder for application to mica flakes, the resinous binder being of such a nature that the composite material may be machined and molded in an intermediate stage and thereafter thermoset to final shape.

Other objects of the invention will, in part, be obvious and will, in part, appear hereinafter.

For a fuller understanding of the nature and objects of the invention, reference should be had to the drawing, in which:

Figure 1 is a perspective view of a sheet of insulation composed of mica flakes and the resinous binder;

Fig. 2 is a greatly enlarged cross-section of a portion of the sheet of Fig. 1;

Fig. 3 is a view in elevation, partly in cross-section, of a V-ring embodying the invention; and Fig. 4 is a fragmentary cross-sectional view through a commutator of a dynamoelectric machine.

According to this invention, a resin has been produced that meets the electrical and physical requirements herein set forth for a satisfactory resinous binder for use in combination with mica flakes and other materials. The resinous binder is produced by reacting one mol of pentaerythritol, one and one-half mols of maleic anhydride within plus or minus 10%, and one-half mol of phthalic anhydride within plus or minus 10%. In order to secure the optimum properties, the constituents must be employed within these critical proportions.

Indicative of the critical nature of these proportions is that a resin produced by reacting one mol of pentaerythritol, one and three-quarters mols of maleic anhydride, and one-fourth mol of phthalic anhydride refused to harden sufficiently during an initial molding, whereby during sanding the sanding roll was covered up with a gummy residue, and the exposed resin was tacky. Also the finished thermoset product was spongy and had unsatisfactory physical properties.

In practicing the invention phthalic acid or phthalic anhydride, and maleic acid or maleic anhydride may be used. The anhydrides are more convenient since there is less water of condensation to remove during reaction. In the specification and claims, the terms maleic acid and phthalic acid will be understood, accordingly, to denote the use of the anhydride.

The following process for producing the resinous binder is illustrative. An enclosed reaction vessel equipped with a reflux condenser is charged with the proper mole ratios of pentaerythritol, maleic anhydride, and phthalic anhydride. The temperature of the vessel is gradually raised to 130° C. during which heating the solids melt into a white paste-like mass. Carbon dioxide or nitrogen is passed in to maintain a non-oxidizing atmosphere. The temperature rises rapidly after a temperature of about 130° C. has been reached due to the exothermic reaction of the ingredients. The mixture in the reaction vessel will gradually become clearer. Overheating is undesirable; therefore, the application of external heat may be discontinued once exothermic reaction has begun to take place. As the reaction nears completion and less heat is evolved, it may be again necessary to apply external heat to maintain a temperature of from 125° C. to 130° C. until the reaction is completed. Periodic titrations are made to trace the progress of the reaction by determining the acid number of the reaction mixture. It will be noted that the mixture becomes increasingly more viscous with time of reaction.

For the purpose of this invention an acid number of from about 220 to 280 is indicative that a suitable reaction product has been attained. In some cases a higher or lower acid number reaction product may be satisfactory for the intended purpose. If the resinous reaction product of this acid number is discharged from the vessel and cooled to room temperature, it solidifies to a tacky hygroscopic solid which is sufficiently brittle to shatter under impact. The resinous product has the most desirable physical properties if the ball and tapered ring softening point is maintained between 50° C. and 80° C. A desirable product has a ball and ring softening point of 65° C. It will be appreciated that the softening point and other physical properties may be varied to meet the requirements of the particular application in mind.

When heat treated at temperatures of 150° C. to 200° C., the resinous reaction production undergoes progressive hardening, finally becoming completely thermoset. Before reaching a fully thermoset state the resin is thermoplastic and members carrying the resin in this state may be readily molded or shaped under heat and pressure.

The resinous reaction product is soluble in acetone, ethanol, and solvent mixtures, such as acetone-benzene and ethanol-benzene. Numerous other solvents may be employed, and no extended list thereof need be given.

For application to mica flakes a solution containing from 2% to 25% by weight of the resin in the solvent may be employed. In order to avoid evaporating large quantities of solvent without, however, producing too viscous a solution, both an 8% and a 15% solution of the resin in a solvent have been found to be most suitable in mica insulation manufacturing applications. Depending on the proportion of resin binder desired, either solution of the resin may be applied to mica flakes.

To manufacture flat mica sheets which may be used for punching or cutting commutator insulation and other simple shaped insulation, the following procedure is exemplary: A layer of mica flakes is applied to the bed of a travelling screen, such as is employed in the conventional mica plate building machine. The 8% or 15% solution of resinous binder is applied to the mica flakes by spraying or dripping; thereafter the sheet is subjected to light pressure under a roll in order to cause the solution to penetrate between all the mica flakes. The thin sheets so produced are passed through an oven operating at a temperature range of 100° C. to 135° C. to remove the solvent. The sheets are cut and stacked to produce a plate of predetermined thickness. This plate is subjected to a load of 200 tons on a plate 36″ x 24″ continued for about 15 minutes or more. The weight of resinous binder in the pressed sheet for most purposes may vary from 3% to 15% or higher of the total weight of the plate.

Referring to Fig. 1 of the drawing, there is shown the flat mica insulating plate 10 produced by this process. The plate consists of a great number of mica flakes 12 cemented with the binder of this invention. A magnified cross-sectional view of the plate of Fig. 1 is shown in Fig. 2 where the mica flakes 12 are illustrated as adherently cemented together by the binder 14 composed of the pentaerythritol-maleate-phthalate resin. To secure the minimum seasoning set of from 1% to 2¼%, it may be desirable to press the plate 10 at a higher pressure for a longer period of time. A pressure of 400 to 500 tons on the plate for one hour or more will assure the attainment of this characteristic. The press in both cases is heated to a temperature of from 150° C. to 200° C.

Between the first and second pressing the resin is sufficiently thermoset to allow sanding and cutting or punching of the plate 10 into various shaped pieces to be employed, for example, as insulation between commutator segments. It will be discovered that the mica plate will punch easily without shattering, squeezing or forming ragged edges. Holes may be punched relatively close together without cracking between holes. The insulation may be sanded at any time after the first pressing to a predetermined thickness. In some cases where an unexpected hollow or depression occurs in the plate 10, this may be patched with fresh resin solution and mica flakes, repressed for a brief period of time, and sanded to the desired thickness. The resin is sufficiently hard to sand freely without gumming up the sanding drums or belt or other abrasive device. The flat plate 10, or punched portions thereof, after being pressed a second time at a higher pressure at temperatures of 150° C. to 200° C. will be completely thermoset. In this state the insulation will be highly resistant to moisture and solvents. The product is characterized by an extremely low compressibility.

The most severe physical requirements imposed on mica insulation are met in V-ring applications, particularly in V-rings used in many high capacity, high-speed dynamoelectric machines manufactured at the present day. Due to the high speeds, the V-rings are frequently subjected to pressures of the order of 10,000 pounds per square inch or more in the machines while being heated to temperatures of the order of 175° C. The resinous binder of this invention in combination with mica flakes is fully adequate to this severe service.

In Fig. 3 is shown a partial view of a V-ring 20 embodying the invention. The V-rings may be prepared as a complete circle or in several segments.

In producing V-rings the mica flakes are treated with from 8% to 15% of the pentaerythritol-maleate-phthalate binder. The composite material is pressed at a pressure of 20 to 40 tons applied to a flat sheet of 24 inches by 36 inches and a temperature of from about 150° C. to 175° C. applied for about 3 minutes. The binder is sufficiently hardened to provide for sanding without being gummy, but still sufficiently thermoplastic to permit molding to shape.

A complete circular collar or a portion of a circle, depending on what type of V-ring is being produced, is cut or stamped out of the plate which has been sanded to predetermined thickness. The collar is pressed in a high compression mold to a V-ring shape at a temperature of 150° C. and higher for a period of time of the order of an hour to cause the resin to become thermoset.

Since many failures of V-ring insulation occur at the apex 26, it is sometimes desirable to reinforce the V-ring by applying to the outside of the V a sheet of inorganic fibrous material 24, for example, a glass fabric. The glass fabric 24 may be impregnated with the pentaerythritol-maleate-phthalate binder of this invention or a vinyl acetate or other binder, depending upon the requirements. On subjecting to heat and pressure, the binder applied to the fibrous sheet material will not only impregnate the interstices between the fibers, but also cause adhesion to the mica flake body. If desired, a sheet of fibrous material 28 may be also applied inside of the V, but this is not entirely necessary.

Application of the invention to dynamoelectric machines is shown in Fig. 4 of the drawing. A portion of the rotor of the dynamoelectric machine is shown at 30 carrying a commutator block 32 to which is applied one V-ring 20 and a mating block 34 carrying a second V-ring 20. Bolt 36 or its equivalent provides for applying adequate pressure to retain commutator segments 38 between the V-rings 20. A sheet of mica insulation 40 of cylindrical form may also be applied between the commutator segments 38 and the blocks 34 and 32. Between each of the commutator segments 38 is a stamped or punched sheet 42 of mica insulation.

The properties of mica insulation produced by the application of the resinous binder of this invention compared with insulation produced with mica is shown in the following table:

TABLE II
*Low compression commutator plate*

| Test | P-M-P Resin | Shellac |
| --- | --- | --- |
| Bond content | 7.4% | 4.5%. |
| Water absorption, 24 hrs. on 1″ x 3″ sample at 25 p. s. i. compression. | 3.83% | 3.77%. |
| Tensile strength | 23,500 p. s. i. | 21,170 p. s. i. |
| Elongation on 2″ | 0.50% | 0.13%. |
| Seasoning set, 3 hrs. at 200° C., 1000 p. s. i. | 1.3% | 1.3%. |
| Dielectric strength on .032″ sample (short time). | 1000 v./mil | 890 v./mil. |
| Dielectric strength on .032″ sample (step by step). | 750 v./mil | 603 v./mil. |
| Power factor 800 v. at 32° C | 3.77% | 1.80%. |
| Surface resistivity, 1″ x 2″ electrode ½″ spacing, 5000 v. | 664 megohms | 1,170 meg. |
| Arc resistance | 238 secs | 192 secs. |
| Tracking (tested ½ hour) | None | None. |
| Weight loss 150° C. for 144 hrs | 0.46% | 0.32%. |
| Charpy impact test | 3.1 in lbs | 2.4 in lbs. |

It will be apparent from the above table that in the important properties of dielectric strength, arc resistance and impact test, the insulation of this invention is superior to shellac bonded mica insulation.

While mica flakes have been specifically set forth as the material to which the binder is to be applied, other natural and synthetic sheet material may be combined with the binder to produce electrical insulation. Synthetic mica has been produced which may be treated in the same way as natural mica. Films of treated bentonite may be cemented into members of predetermined size by the application of the resinous binder disclosed herein. It is unnecessary to add any fillers or finely divided material to the resin inasmuch as the resin readily thermosets to a hard substance having the highest physical properties.

Where it is desired to mold bodies composed essentially of the pentaerythritol maleate-phthalate resin, it may be desirable from a cost standpoint to apply thereto inorganic material, such as silica asbestos fibers, porcelain particles, and other highly dielectric fillers and molding the mixture at predetermined temperatures and pressures to specified shape.

Since certain changes may be made in the above description and different embodiments of the invention may be made without departing from the spirit thereof, it is intended that all the matter contained in the above description shall be considered as illustrative and not in a limiting sense.

We claim as our invention:

1. The moldable resinous reaction product of substantially only 1 mol of pentaerythritol, 1.5 mols±10% of maleic acid and 0.5±10% mol of phthalic acid substantially one mol of pentaerythritol being provided for two mols of maleic acid and phthalic acid combined, the resinous reaction product being moldable into a thermoset state in one hour at 150° C. in relatively thick sections.

2. The moldable resinous reaction product consisting of 1 mol of pentaerythritol, 1.5 mols±10% of maleic acid and 0.5±10% mol of phthalic acid substantially one mol of pentaerythritol being provided for two mols of maleic acid and phthalic acid combined, the reaction resulting in the product being carried out to the extent that the product has an acid number of from about 220 to 280 and a ball and ring softening point of from about 50° C. to 80° C., the resinous reaction product being moldable into a thermoset state in one hour at 150° C. in relatively thick sections.

3. A resin solution for application to members consisting essentially of the resinous reaction product only of 1 mol of pentaerythritol, 1.5 mols±10% of maleic acid and 0.5±10% mol of phthalic acid substantially one mol of pentaerythritol being provided for two mols of maleic acid and phthalic acid combined, and a solvent for the reaction product, the resinous reaction product being moldable into a thermoset state in one hour at 150° C. in relatively thick sections.

4. A resin solution for application to members consisting of from about 2% to 25% of the resinous reaction product of 1 mol of pentaerythritol, 1.5 mols±10% of maleic acid and 0.5±10% mol of phthalic acid substantially one mol of pentaerythritol being provided for two mols of maleic acid and phthalic acid combined, and substantially all the remainder a solvent for the reaction product, the resinous reaction product being moldable into a thermoset state in one hour at 150° C. in relatively thick sections.

5. Electrical insulation comprising in combination, mica and from 3% to 15% by weight of a binder for bonding the mica into a predetermined shape, the binder composed of essentially the resinous reaction product of 1 mol of pentaerythritol, 1.5 mols±10% of maleic acid and 0.5±10% mol of phthalic acid substantially one mol of pentaerythritol being provided for two mols of maleic acid and phthalic acid combined.

6. Electrical insulation comprising in combination, mica and from 3% to 15% by weight of a binder for bonding the mica into a predetermined shape, the binder consisting of the resinous reaction product of substantially only 1 mol of pentaerythritol, 1.5 mols±10% of maleic acid and 0.5±10% mol of phthalic acid substantially one mol of pentaerythritol being provided for two mols of maleic acid and phthalic acid combined, the reaction resulting in the product being carried to the extent that the product has an acid number of from about 220 to 280 and a ball and ring softening point of from about 50° C. to 80° C.

7. A composition comprising a flake material and from 3% to 15% by weight of a binder for the flake material, the binder composed of the resinous reaction product of 1 mol of pentaerythritol, 1.5 mols±10% of maleic acid and 0.5±10% mol of phthalic acid substantially one mol of pentaerythritol being provided for two mols of maleic acid and phthalic acid combined.

8. A composition comprising a flake material and from 3% to 15% by weight of a binder for the flake material, the binder composed of the resinous reaction product of 1 mol of pentaerythritol, 1.5 mols ±10% of maleic acid and 0.5±10 mol of phthalic acid substantially one mole of pentaerythritol being provided for two mols of maleic acid and phthalic acid combined, the reaction resulting in the product being carried and to the extent that the product has an acid number of from about 220 to 280 and a ball and ring softening point of from about 50° C. to 80° C.

9. Molded electrical insulation comprising in combination, a body composed of from 97 parts to 85 parts by weight of mica flakes and from 3 parts to 15 parts by weight of a thermoset binder for the mica flakes, the binder composed of the resinous reaction product of 1 mol of pentaerythritol, 1.5 mols±10% of maleic acid and 0.5±10% mol of phthalic acid substantially one mol of pentaerythritol being provided for two mols of maleic acid and phthalic acid combined, a sheet of inorganic fibrous material applied to a face of the body for reinforcing the body, and an agent impregnating the interstices of the fibrous material and bonding the sheet fibrous material to the body, the whole molded into predetermined shape under heat and pressure.

10. A V-ring comprising, in combination, a body of from 97 parts to 85 parts by weight of mica flakes and from 3 parts to 15 parts by weight of a thermoset binder for the mica flakes, the binder composed of the resinous reaction product of 1 mol of pentaerythritol, 1.5 mols±10% of maleic acid and 0.5±10% mol of phthalic acid substantially one mol of pentaerythritol being provided for two mols of maleic acid and phthalic acid combined, a sheet inorganic fibrous material applied to the outside of the V-ring for reinforcement thereof, and a binder impregnating and bonding the fibrous material to the body.

ROBERT H. RUNK.
ROBERT D. JERABEK.

REFERENCES CITED

The following references are of record in the file of this patent:

UNITED STATES PATENTS

| Number | Name | Date |
|---|---|---|
| 2,194,894 | Ellis | Mar. 26, 1940 |
| 2,270,889 | Nagel | Jan. 27, 1942 |
| 2,288,315 | D'Alelio | June 30, 1942 |
| 2,319,780 | Pellett | May 25, 1943 |
| 2,319,826 | Pellett | May 25, 1943 |

FOREIGN PATENTS

| Number | Country | Date |
|---|---|---|
| 500,547 | Great Britain | Feb. 8, 1939 |
| 540,168 | Great Britain | Oct. 8, 1941 |